United States Patent
Stone

(10) Patent No.: US 9,523,292 B2
(45) Date of Patent: Dec. 20, 2016

(54) VALVE CONTROL SYSTEM FOR INTERNAL COMBUSTION ENGINES AND METHOD OF OPERATION THEREOF

(71) Applicant: Camcon Auto Limited, Cambridgeshire (GB)

(72) Inventor: Roger Derrick Stone, East Sussex (GB)

(73) Assignee: Camcon Auto Limited, Cambridgeshire (GB)

( * ) Notice: Subject to any disclaimer, the term of this patent is extended or adjusted under 35 U.S.C. 154(b) by 0 days.

(21) Appl. No.: 14/419,974

(22) PCT Filed: Aug. 6, 2013

(86) PCT No.: PCT/GB2013/052095
§ 371 (c)(1),
(2) Date: Feb. 6, 2015

(87) PCT Pub. No.: WO2014/023949
PCT Pub. Date: Feb. 13, 2014

(65) Prior Publication Data
US 2015/0167503 A1 Jun. 18, 2015

(30) Foreign Application Priority Data

Aug. 6, 2012 (GB) .................................. 1213945.7

(51) Int. Cl.
*F01L 1/34* (2006.01)
*F02D 41/00* (2006.01)
(Continued)

(52) U.S. Cl.
CPC ............. *F01L 1/34* (2013.01); *F02D 13/0203* (2013.01); *F02D 41/0002* (2013.01);
(Continued)

(58) Field of Classification Search
CPC .................. F01L 1/34; F01L 9/02; F01L 9/04; F02D 41/062; F02D 41/2438; F02D 41/2441; F02D 41/2464; F02D 41/009
(Continued)

(56) References Cited

U.S. PATENT DOCUMENTS 6,092,495 A * 7/2000 Hackett ..................... F01L 9/02
123/198 D
6,343,577 B2 * 2/2002 Toriumi ..................... 123/90.11
(Continued)

FOREIGN PATENT DOCUMENTS

DE 10 2004 063 543 A1 7/2006
EP 1 136 659 A2 9/2001
EP 1 482 152 A2 12/2004

OTHER PUBLICATIONS

Espacenet, English Machine Translation of DE102004063543A1, published Jul. 13, 2006, retrieved from http://worldwide.espacenet.com on Jan. 21, 2015 (11 pages).
(Continued)

*Primary Examiner* — Ching Chang
(74) *Attorney, Agent, or Firm* — Wood Herron & Evans LLP

(57) ABSTRACT

A valve control system for an internal combustion engine, the engine having at least one cylinder with at least one intake or exhaust valve and a piston and the valve being operable independently of the rotation of the engine crankshaft. The system is configured to generate a control signal that controls a preconditioning actuation cycle of an actuator prior to a first combustion cycle of the engine, receive a feedback signal relating to an operating condition of the actuator during the preconditioning actuation cycle, and generate a modified control signal that controls a combustion actuation cycle of the actuator, modified with reference to the feedback signal. This recalibration of the valve control (Continued)

signals allows the current operating conditions of the valve train to be taken into account before the first combustion cycle of the engine.

12 Claims, 9 Drawing Sheets

(51) Int. Cl.
    *F02D 41/06*     (2006.01)
    *F02D 41/20*     (2006.01)
    *F02D 41/24*     (2006.01)
    *F02D 13/02*     (2006.01)
    *F01L 9/02*     (2006.01)
    *F01L 9/04*     (2006.01)

(52) U.S. Cl.
    CPC ......... *F02D 41/009* (2013.01); *F02D 41/062* (2013.01); *F02D 41/20* (2013.01); *F02D 41/2438* (2013.01); *F02D 41/2441* (2013.01); *F02D 41/2464* (2013.01); *F01L 9/02* (2013.01); *F01L 9/04* (2013.01); *F02D 2041/001* (2013.01); *F02D 2041/0092* (2013.01); *F02D 2041/0095* (2013.01); *F02D 2041/2051* (2013.01); *F02D 2041/2058* (2013.01); *F02D 2041/2065* (2013.01); *F02D 2200/021* (2013.01); *F02D 2200/023* (2013.01); *F02D 2200/0414* (2013.01); *Y02T 10/18* (2013.01); *Y02T 10/42* (2013.01)

(58) Field of Classification Search
    USPC .......................................... 123/90.15, 90.17
    See application file for complete search history.

(56) References Cited

U.S. PATENT DOCUMENTS

| | | |
|---|---|---|
| 2003/0136361 A1 | 7/2003 | Ogiso |
| 2005/0103290 A1 | 5/2005 | Magner et al. |
| 2006/0027196 A1 | 2/2006 | Shimojo et al. |
| 2006/0157009 A1 | 7/2006 | Gaessler et al. |
| 2007/0095313 A1 | 5/2007 | Kamiyama et al. |

OTHER PUBLICATIONS

European Patent Office, International Search Report and Written Opinion of the International Searching Authority, International Application No. PCT/GB2013/052095, mailed Dec. 3, 2013 (9 pages).
United Kingdom Intellectual Property Office, Patents Act 1977: Search Report under Section 17, Application No. GB1213945.7, date of search Dec. 7, 2012 (1 page).

* cited by examiner

VALVE CONTROL SYSTEM FOR INTERNAL COMBUSTION ENGINES AND METHOD OF OPERATION THEREOF

CROSS-REFERENCE TO RELATED APPLICATIONS

This application is a submission under 35 U.S.C. §371 of International Application No. PCT/GB2013/052095, filed Aug. 6, 2013, which claims priority to Great Britain Application No. 1213945.7, filed Aug. 6, 2012, the disclosures of which are hereby expressly incorporated by reference herein in their entireties.

FIELD OF THE INVENTION

The present invention relates to a valve control system for an internal combustion engine, the engine having at least one cylinder with at least one valve and a piston. More particularly, it is concerned with improving the operation of valve control systems which can be actuated independently of rotation of the engine crankshaft.

BACKGROUND OF THE INVENTION

It is well known to operate inlet and exhaust valves of an internal combustion engine by means of a rotating camshaft. If the camshaft is rotated together with the crankshaft of the engine, it is not possible to alter the valve movement profile and/or timing in relation to the engine speed or loading. However, greater efficiency can be achieved by varying the valve operation with regard to the demands on the engine.

In order to give greater control over the valve actuation, it has been proposed to operate the valves using electromagnetic solenoid actuators governed by a computer-controlled engine management system. An alternative approach is described in WO 2004/097184. This relates to an electromagnetic actuator having a driven rotor which is coupled to the valve by a suitable linkage.

SUMMARY OF THE INVENTION

The present invention provides a valve control system for an internal combustion engine, the engine having at least one cylinder with at least one valve and a piston, wherein the valve control system comprises a signal processing arrangement which is configured to:

generate a control signal that controls a pre-conditioning actuation cycle of an actuator arranged to actuate the at least one valve which is carried out prior to a first combustion cycle of the engine;

receive a feedback signal relating to an operating condition of the actuator during the pre-conditioning actuation cycle; and generate a modified control signal that controls a combustion actuation cycle of the actuator which is carried out during a combustion cycle of the engine, wherein the modified control signal has been modified by the signal processing arrangement with reference to the feedback signal.

The systems and methods of the invention are applicable to engines having at least one cylinder with the at least one valve being at least one intake or exhaust valve and a piston, wherein the at least one valve is operable independently of rotation of the engine crankshaft.

A valve control system involving electrical rather than mechanical control of the valve actuation timing will benefit from adaptive feedback. This enables the valve control system to adapt the operation of each valve according to particular conditions and operational requirements. However, when starting an engine, the operating conditions will have changed from the time at which the engine last stopped. Whilst the valve control system may be configured to take into account directly measurable parameters such as engine oil and water temperature, other significant variables remain unknown. This could cause significant errors in the initial valve events during and immediately after engine start. This could detrimentally affect the constitution of the gaseous emissions from the engine, its noise, vibration and harshness characteristics, the ability to start the engine, its idle stability, and the driver's perception of the engine's operation.

A number of rapidly changing parameters may be measured and taken into account by the valve control system when computing the requirements for an initial, pre-conditioning actuation signal to an actuator. These may include one or more of the engine coolant temperature, the sump oil temperature, the ambient air temperature, and the actuator winding temperature, for example, and/or other relevant parameters. Also, parameters which change relatively slowly, such as those dependent on the effects of component wear and/or degradation of lubricating oil properties, can be stored in the valve control system memory ready to be taken into account when it is necessary to re-start the engine. However, it is unlikely that these parameters will be sufficient to provide the control accuracy required at the time of ignition of the engine.

According to the invention, the valve control system causes a valve to carry out a pre-conditioning actuation cycle prior to a first combustion cycle of the engine. A feedback signal associated with this actuation is then employed to modify or calibrate a subsequent control signal for the valve governing actuation of the valve during a combustion cycle of the engine. As the time taken to carry out a valve actuation can be short (of the order of 7 ms), one or more pre-conditioning cycles can be carried out for some or all of the valves prior to ignition of the engine whilst being virtually undetectable to the vehicle user.

In a four-stroke engine for example, a combustion cycle of the engine is understood to consist of a cycle of four piston strokes, generally referred to as the induction, compression, firing and exhaust strokes, respectively.

This "pre-conditioning" of the valve system will allow the recalibration of the valve control signals to take into account the current operating conditions of the valve train before the first combustion cycle of the engine. That is, it is carried out before fuel and ignition are provided to the cylinder for spark-ignition engines or before fuel is supplied in the case of compression-ignition engines.

An additional benefit in an electromagnetic actuation configuration is that the actuator windings may undergo a significant proportion of the warming up period they require to approach or achieve normal operating conditions during the pre-conditioning procedure.

In one embodiment, the pre-conditioning actuation cycle is carried out during cranking of the engine by a starter motor of the engine. Thus, the pre-conditioning actuator cycling stage may be carried out during the initial cranking stage of the engine.

According to another embodiment, the pre-conditioning actuation cycle is carried out prior to cranking of the engine by a starter motor of the engine. In this way, the actuator cycling stage may be conducted after the vehicle user has initiated an engine start and before the start of engine cranking by the starter motor.

Depending on the application, the valve control system may be configured to either carry out the valve pre-conditioning prior to initial cranking of the engine, or instead during the initial cranking. Alternatively, one or both of these options may be selected depending on the particular circumstances at the time of engine start-up. When greater engine stability is required at start-up, the number of pre-conditioning cycles executed may be increased during pre-cranking cycling, or during cranking, or both.

The accuracy of the calibration of the valve control system may be enhanced by operating several actuation cycles of each valve before combustion is initiated. The actuator control signal may be modified in response to each feedback signal after each cycle or in response to a plurality of feedback signals corresponding to a plurality of respective actuation cycles.

Preferably, at least three cycles of each valve are executed.

The pre-conditioning cycling of valves in different cylinders of the same engine may be carried out sequentially, cylinder by cylinder. Alternatively, the actuation cycles of valves in different cylinders may be overlapped to some extent to reduce the total time taken to cycle through all of the valves.

It may be preferable to phase (that is, stagger the start time of the pre-cycling for each valve or cylinder) the actuator cycling events during the pre-conditioning cycling (where sufficient time is available) to reduce the peak electrical demand on the power source.

It will be appreciated that the present concept is applicable to engines having valves which are operable independently of rotation of the engine crankshaft, wherein control of their actuation involves some form of adaptive, electrical feedback. The valve actuators may operate electromagnetically, hydraulically and/or pneumatically. Thus, the term "actuator" is intended to encompass any electromagnetic, pneumatic or hydraulic device producing a force or a torque for operating an associated valve.

The feedback signal received by the signal processing arrangement may be responsive to one or more operating conditions of the respective valve actuator. For example, the feedback signal may be responsive to at least one of: the actuator displacement relative to a home position, the temperature of a winding in the actuator, the magnitude of a current in a winding of the actuator, the valve lift away from its seat, the voltage across the actuator, at least one pressure within the actuator, at least one pressure difference within the actuator, and the like.

Preferably, the modified control signal which takes into account the feedback from the pre-conditioning actuation cycle controls the combustion actuation cycle of the actuator which is carried out during the first combustion cycle of the engine. Vehicle emission regulations apply to all emissions right from the moment the engine starts and so it is desirable for the valve timing to be carefully controlled from the first combustion cycle onwards. The adaptive, feedback-based control of the valves continues during operation of the engine, with the feedback being used to update stored values of parameters corresponding to different characteristics of the valve control system and/or engine.

The present invention also provides an internal combustion engine including at least one cylinder with at least one associated valve and a valve control system as described herein.

Internal combustion engines usually include valves in the form of poppet valves, and at least one inlet valve and at least one exhaust valve per cylinder. The invention is also applicable to other configurations, including engines with only exhaust valves such as heavy duty and medium speed diesels, used in marine applications for example.

According to a further aspect, the present invention provides a method of calibrating a valve control system of an internal combustion engine, the engine having at least one cylinder with at least one valve and a piston, and a valve control system as described herein, the method comprising the steps of:

generating a control signal with the signal processing arrangement that controls a pre-conditioning actuation cycle of the at least one valve which is carried out prior to a first combustion cycle of the engine;

receiving a feedback signal at the signal processing arrangement relating to an operating condition of an actuator arranged to actuate the at least one valve during the pre-conditioning actuation cycle; and generating a modified control signal with the signal processing arrangement that controls a combustion actuation cycle of the actuator which is carried out during a combustion cycle of the engine, wherein the modified control signal has been modified with reference to the feedback signal.

In determining a modified control signal that controls a combustion actuation cycle of the actuator, the signal processing arrangement takes into account the feedback signal relating to an operating condition of the actuator. In addition, the modified control signal may also be responsive to other parameters influencing the performance characteristics of the valve and/or other parts of the engine.

BRIEF DESCRIPTION OF THE DRAWINGS

Embodiments of the invention will now be described with reference to the accompanying schematic drawings, wherein.

DETAILED DESCRIPTION OF THE DRAWINGS

Figure 1:
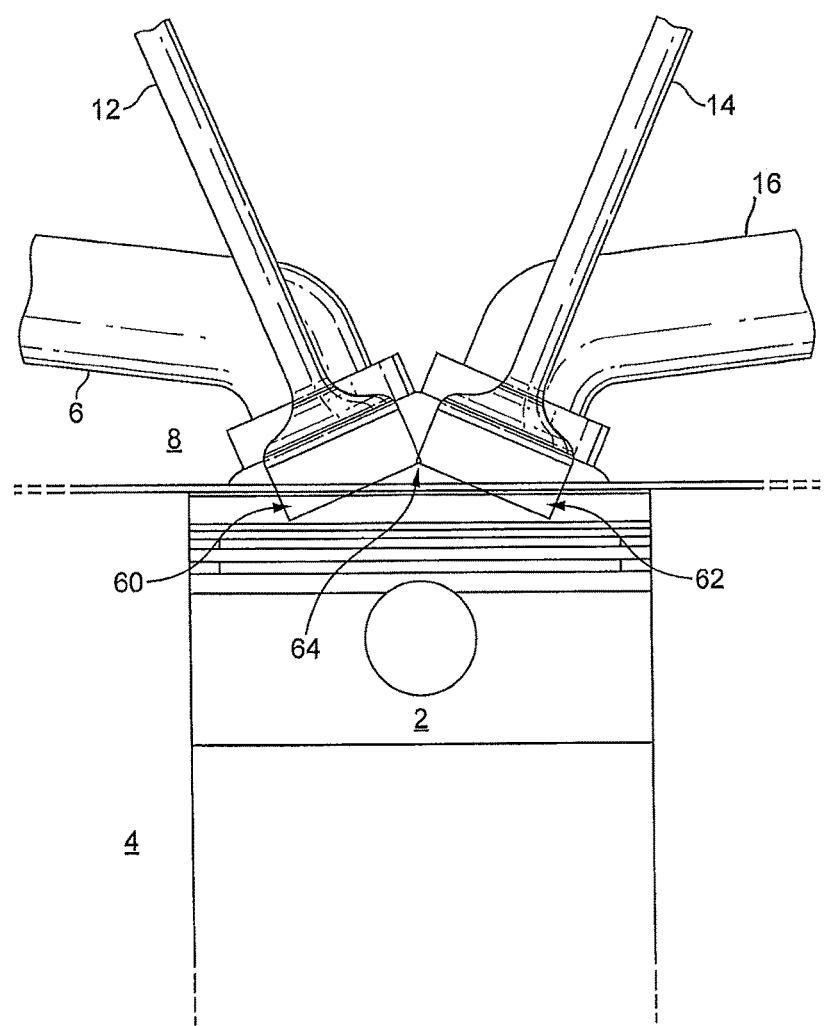
FIG. 1 is a cross-sectional side view of the upper portion of a cylinder in a known internal combustion engine.

FIG. 1 shows a cross-sectional view of a cylinder of a well-known internal combustion engine configuration. A piston 2 is arranged to reciprocate up and down within a cylinder block 4. The flow of charge air (or an air and fuel mixture, depending on the engine configuration) from an inlet port 6 within cylinder head 8 into the combustion chamber 10 is controlled using inlet poppet valve 12. Exhaust poppet valve 14 allows exhaust gases to escape from the combustion chamber after combustion has taken place, with the exhaust gases being carried away via exhaust port 16.

Figure 2:
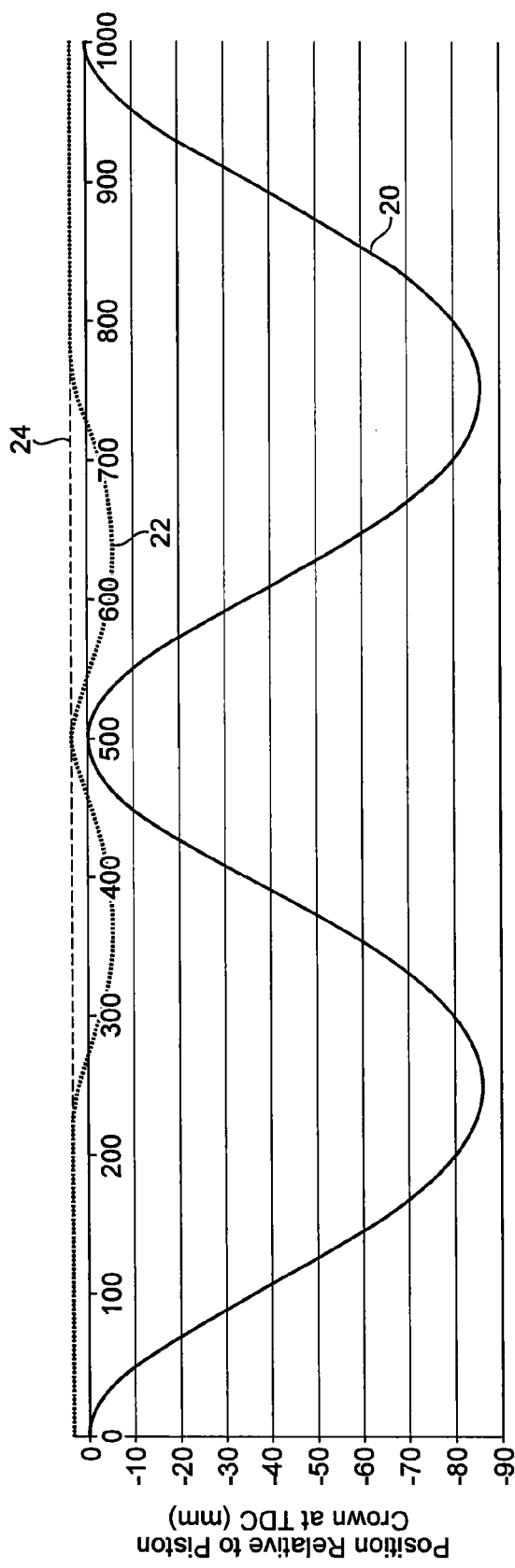
FIGS. 2 and 3 are graphs illustrating the timing of piston and valve motions in engines with mechanical and electromagnetic inlet valve actuation arrangements, respectively.

By way of illustration, FIG. 2 shows plots of the motion of the piston, inlet and exhaust valves during operation of the cylinder at FIG. 1 (with elapsed time on the x-axis). In this example, the crankshaft of the engine is turning at 120 RPM. Plot 20 represents the position over time of the piston crown, plot 22 corresponds to the inlet valve and plot 24 corresponds to the exhaust valve.

Figure 3:
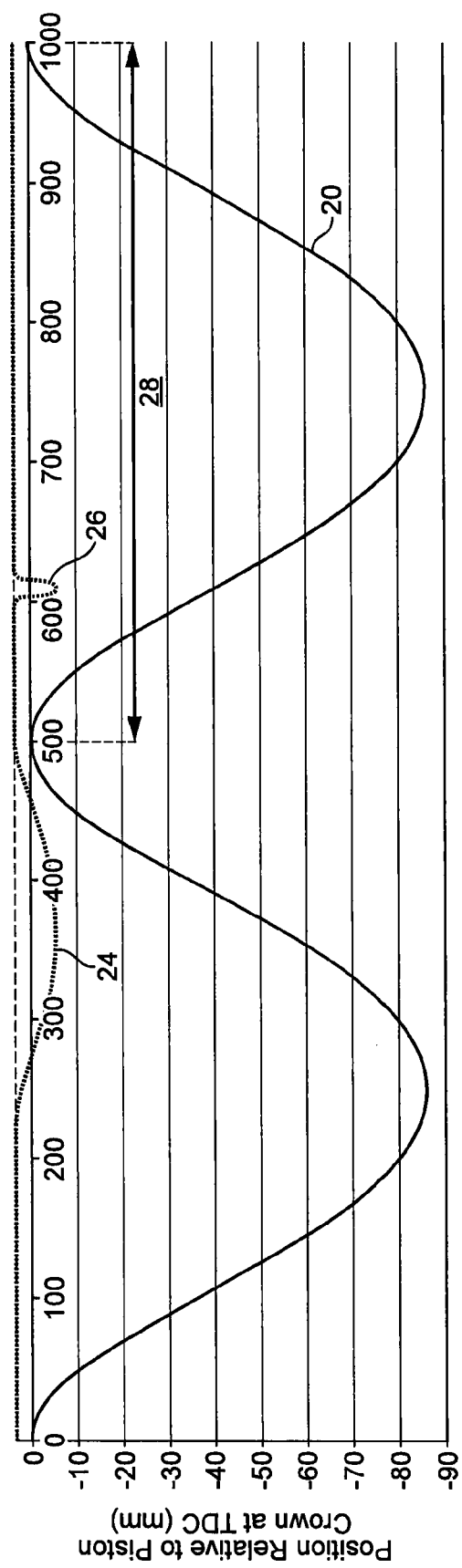

A similar plot is shown in FIG. 3, but in this case, the inlet valve is operated using an actuator which is controllable independently of the crankshaft, resulting in the inlet valve motion indicated by plot 26. The plot of FIG. 3 includes a time period 28, which corresponds to the induction and compression piston strokes of a first combustion cycle of the engine, immediately prior to a first engine firing stroke of the piston. This cycle is carried out when a sufficiently high cranking speed has been reached using the starter motor (and other requirements have been met). The ideal lift height, period and timing for the inlet valve actuation may vary and the inlet valve event shown in FIG. 3 is merely an example.

The inlet valve actuation is caused by the associated actuator executing an actuation cycle, in which the part of the actuator that exerts a force on the valve stem moves away from its initial starting position and then returns to that position. In the case of a rotary actuator, as described for example in WO 2004/097184, an actuation cycle corresponds to a part rotation of the rotor or a complete rotation of the rotor, away from and back to its initial rest position in each case.

Figure 4:
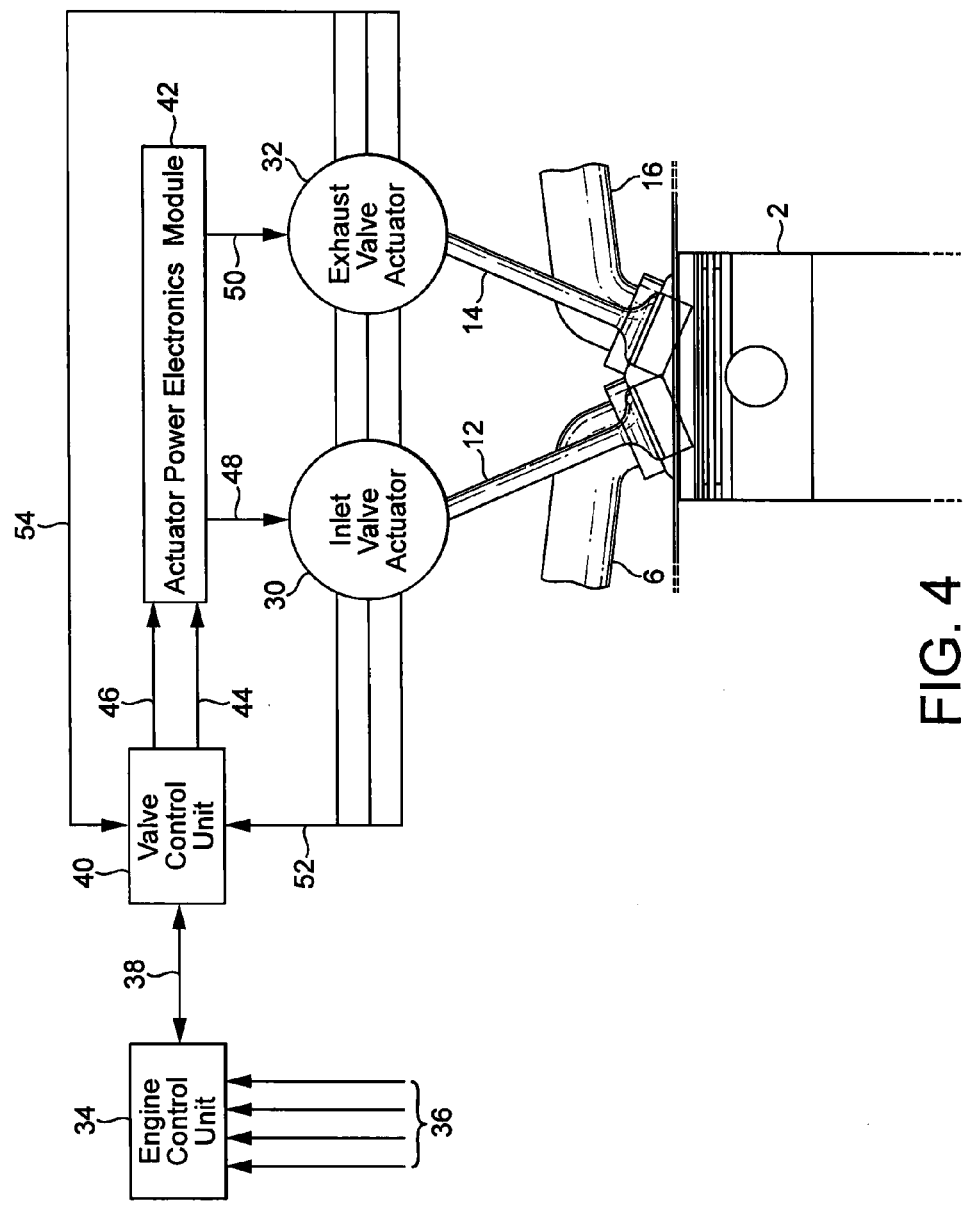
FIG. 4 is a block diagram of an engine control system including a valve control system embodying the present invention.

FIG. 4 shows an engine control system including at least one valve control system embodying the present invention. In this example both the inlet valve and the exhaust valve are individually electronically controllable, independently of the rotation of the engine crankshaft. An actuator 30 is provided to operate the inlet valve and actuator 32 operates the exhaust valve.

The overall operation of the engine is governed by an engine control unit 34. It controls the fuel injection and ignition of a spark ignited engine, or the fuel injection of a compression ignition engine. This is responsive to signals from various transducers monitoring the operating conditions of the engine. For example, they may monitor the crankshaft position, the coolant temperature, the oil temperature, the engine speed, the engine's cranking mode, and so on.

A bi-directional communication link 38 is provided between the engine control unit 34 and a valve control unit 40. In practice, control units 34 and 40 may be physically separate units or integrated into a single controller. Valve control unit 40, together with an actuator power electronics module 42 and the actuators 30 and 32, are part of a valve control system controlling the operation of the inlet and exhaust valves 12, 14.

Having regard to control signals from the engine control unit, the valve control unit in turn generates inlet actuator and exhaust actuator drive signals 44, 46 which are sent to the actuator power electronics module 42. In response to these input signals, module 42 generates inlet actuator and exhaust actuator drive currents along respective conductive lines 48 and 50.

To enable the operation of the actuators to be responsive to changes in their operating conditions, feedback signals 52 and 54 are communicated to the valve control unit from the inlet valve and exhaust valve actuators, respectively. These feedback signals may provide information relating to one or more operating conditions of the respective valve actuator, such as its position, the temperature of electromagnetic windings, current flow in the windings, and the like. The information conveyed by these signals may of course vary depending on the type of actuation employed, whether electromagnetic, hydraulic or pneumatic, for example. It is used to calibrate the operation of the actuators during the first combustion cycle of the engine and as adaptive input to the control system during normal operation.

Some examples of timing sequences for pre-conditioning cycles of independently controlled valves will now be described with reference to FIGS. 5 to 7.

The timing of the valve actuations is constrained to some extent by the need to avoid any contact between the inlet valve, the exhaust valve and the piston. These areas of potential interference are identified in FIG. 1. It can be seen that there is an area of potential piston to inlet valve interference 60, an area of potential piston to exhaust valve interference 62, and an area of potential valve to valve interference 64.

Figure 5:
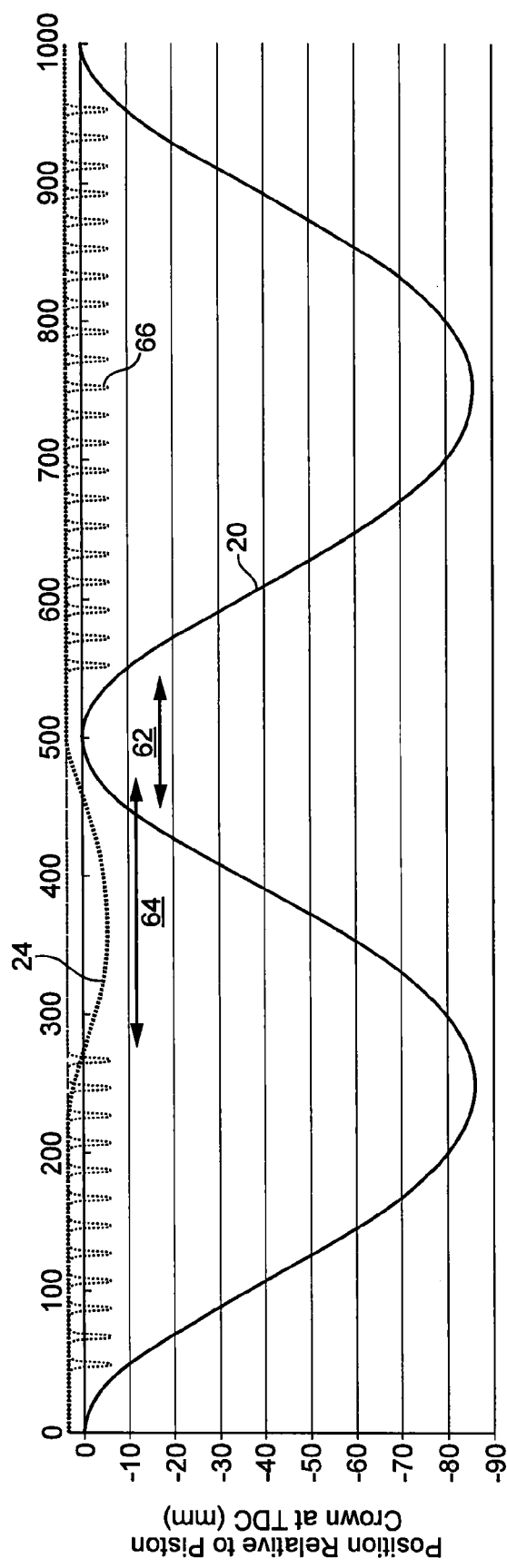
FIGS. 5 and 6 are graphs showing the timing of piston and valve motions during pre-conditioning cycling of an engine according to embodiments of the invention.

FIG. 5 is a graph illustrating the possible timing of inlet valve actuation cycles carried out during initial cranking cycles of the engine crankshaft prior to ignition of the engine. In this example, the exhaust valve is actuated by means of a camshaft synchronised with the engine crankshaft as shown by plot 24, whilst the inlet valve is actuated independently as indicated by plot 66.

Inlet valve actuation does not take place during period 64 to avoid interference with the opening of the exhaust valve or during period 62 to avoid interference with the cylinder pistons around the piston "top dead centre" location. The extent of this "dead area" will vary depending upon the combustion chamber design and geometry. In some engines, there may in practice be no dead area. In others, it may correspond to 45° of crankshaft rotation or more.

In the example illustrated in FIG. 5, the crankshaft is rotating at 120 RPM, and therefore each rotation takes 500 ms. If for example, the dead area extends through 30° of rotation each side of top dead centre of the piston, this leaves 500×300/360=about 417 ms during which the inlet valve can be lifted during a rotation of the crankshaft without risking a collision with the piston.

An inlet valve opening and closing cycle may take for example 7 ms. In the case of a rotary electromagnetic valve actuator (such as described in WO 2004/097184) rotation of the actuator through a full cycle may take say 15 ms. On this basis, there is time for around 27 full valve lift events in a single engine rotation. It would be preferable to avoid operating all the valves simultaneously and it will not be necessary to cycle each valve 27 times to achieve the adaptive feedback required. Instead, the valves may be cycled in sequence to reduce the peak load on the battery.

For example, there is enough time in a single crankshaft rotation at 120 RPM for three cycles per valve (or valve pair or group for multi-valve/cylinder engines) on engines with up to eight cylinders, if only the inlet valves are independently actuated, or two cycles per valve in a four cylinder engine if both the exhaust and inlet valves (or valve pairs or groups) are independently actuated. If required, a further engine revolution or revolutions could be employed to complete the cycling through all of the independently actuated valves. Multiple valves may be operated out of phase to reduce or avoid simultaneous demands for peak current.

The pre-conditioning of the valve system allows the control signals to be sent to the actuators during a fired engine cycle to be calibrated, taking into account the precise operating conditions of the valve train that are present immediately before the first combustion cycle.

The pre-conditioning of the valves may be co-ordinated so that it staggers the cycling of each valve in such a way as to "interlace" cycling to cycle more than one valve (or pair of valves) at a time, but staggering them so that the peak current demands are separated. This would further reduce the time taken for the pre-conditioning.

Figure 6:
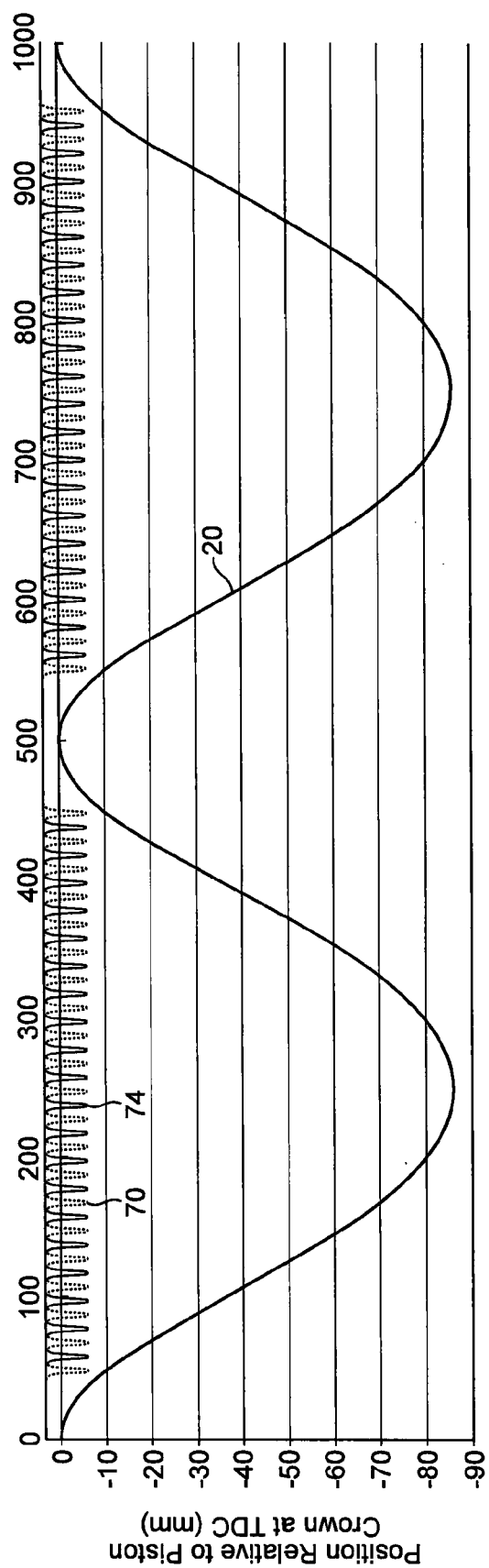

FIG. 6 shows the possible timing of pre-conditioning valve actuations during engine cranking in an engine having both inlet and exhaust valves which are independently actuated. The plot 70 indicates the inlet valve actuation events which are alternated with the exhaust valve actuations, indicated by plot 74. Again, there is a period around the time at which the piston passes through its top dead centre position during which actuation of the inlet and exhaust valves is not carried out.

Figure 7:
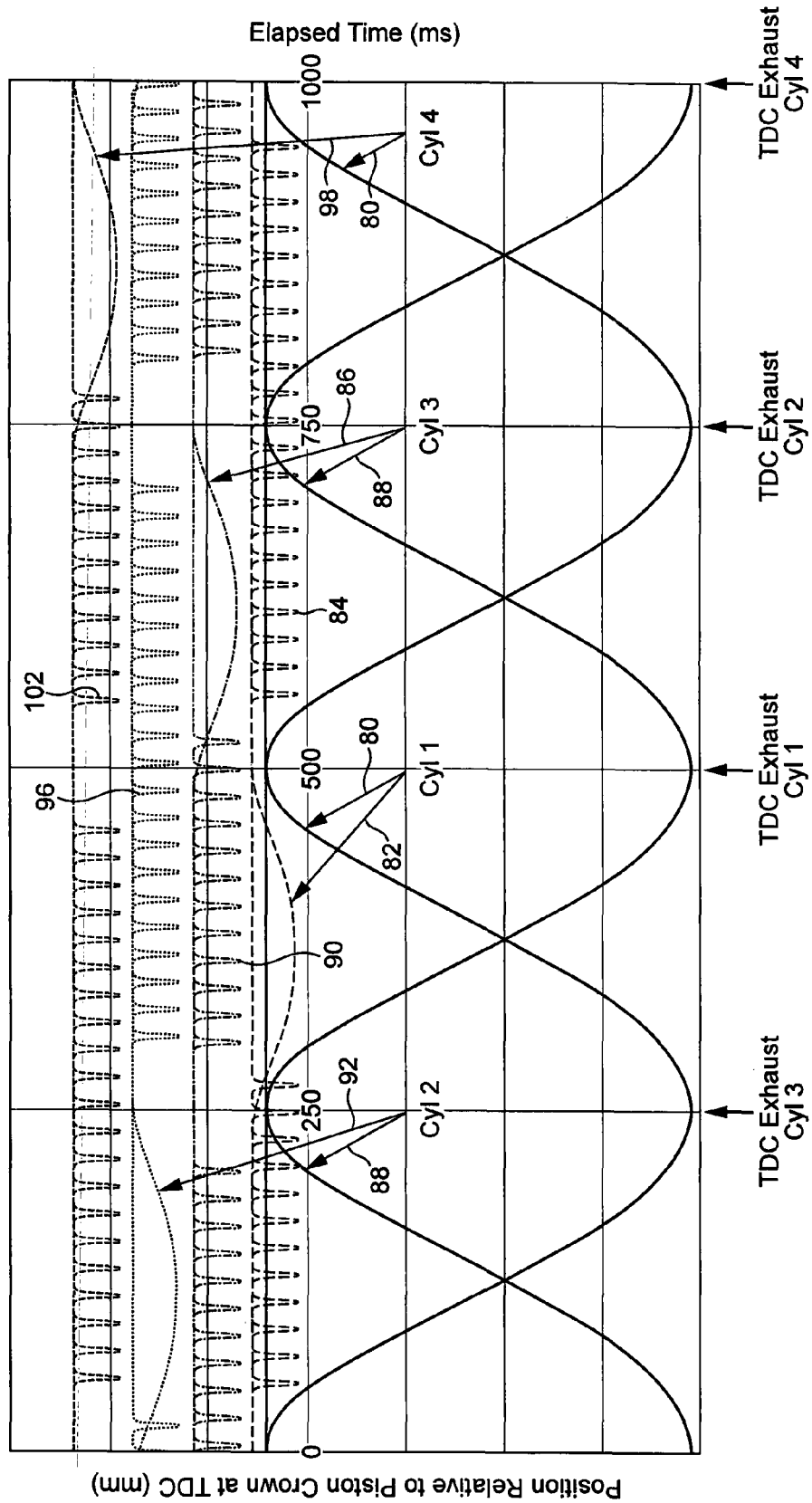
FIG. 7 is a graph illustrating piston and valve motions during pre-conditioning cycling of valves in a four cylinder engine, according to a further embodiment of the invention.

As a further illustration, FIG. 7 shows the possible timing of inlet valve actuations in a four cylinder engine having independently actuated inlet valves only. The firing order in this example is 1-3-4-2. As in FIGS. 5 and 6, the crankshaft is turning at a speed of 120 RPM. The x-axis represents elapsed time, and so the plot records past events, before "time zero" at the left hand side.

Plot 80 represents the piston crown position in cylinders 1 and 4 and plot 88 represents the piston crown position in cylinders 2 and 3. The motion of the exhaust valves of cylinders 1 to 4 are shown by plots 82, 92, 86 and 98, respectively. The possible timing of inlet valve actuations for cylinders 1 to 4 are shown by plots 84, 96, 90 and 102, respectively.

The valve pre-conditioning may be sequenced in relation to firing order and crank starting position such that a normal charge can be introduced to the first firing cylinder soon after the second revolution of the engine crankshaft so that the first firing need not be delayed by the valve cycling exercise. In the case of for example, a six cylinder engine with 24 independently actuated valves (that is two inlet and two exhaust valves per cylinder) which might require more than one revolution to cycle through all of the valves, a first firing stroke soon after the second revolution of the engine crankshaft could be carried out.

Figure 8:
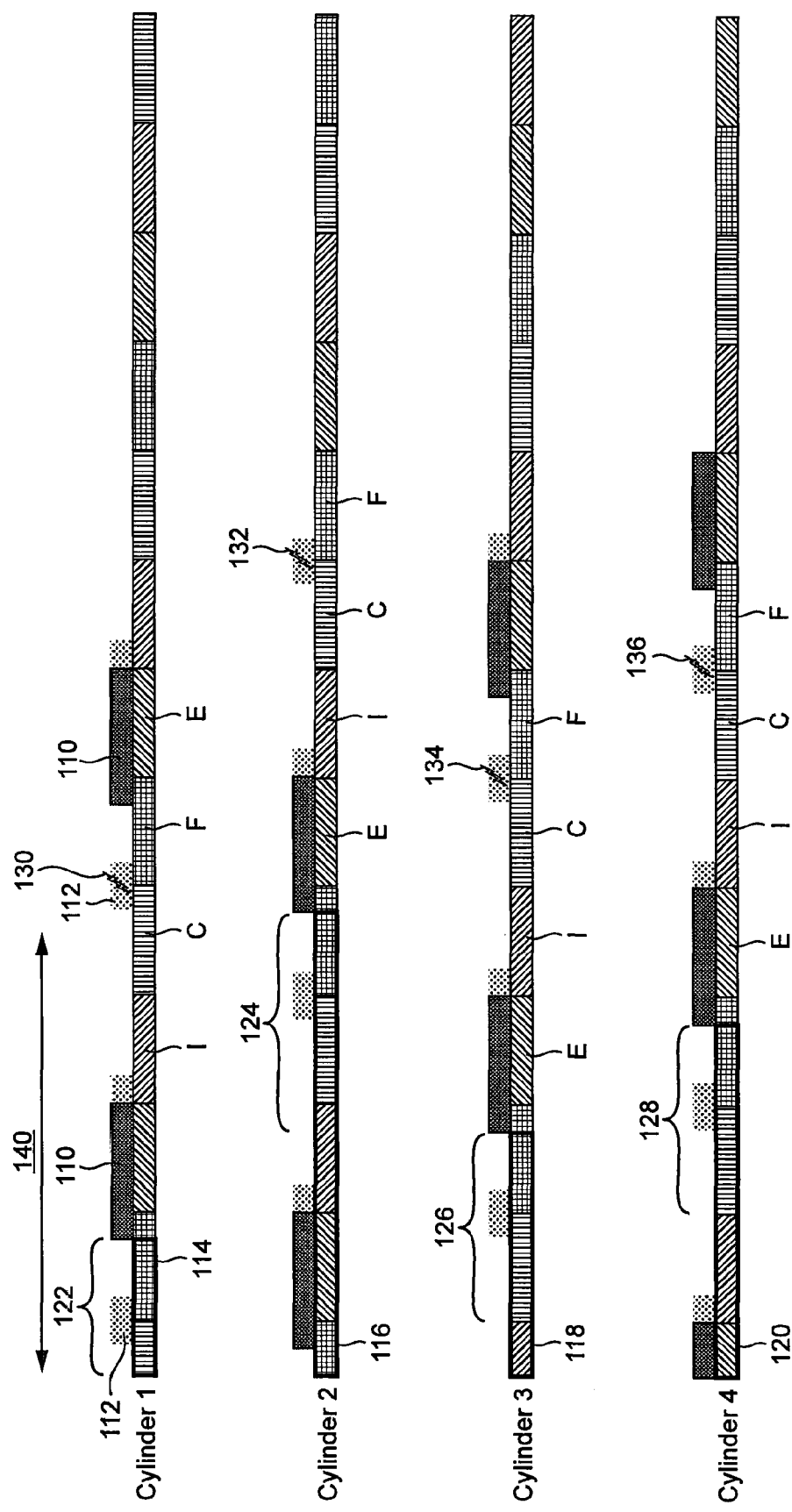
FIGS. 8 and 9 are diagrams illustrating when cylinders may be fired following pre-conditioning cycling in four and six cylinder engines, respectively.
Figure 9:
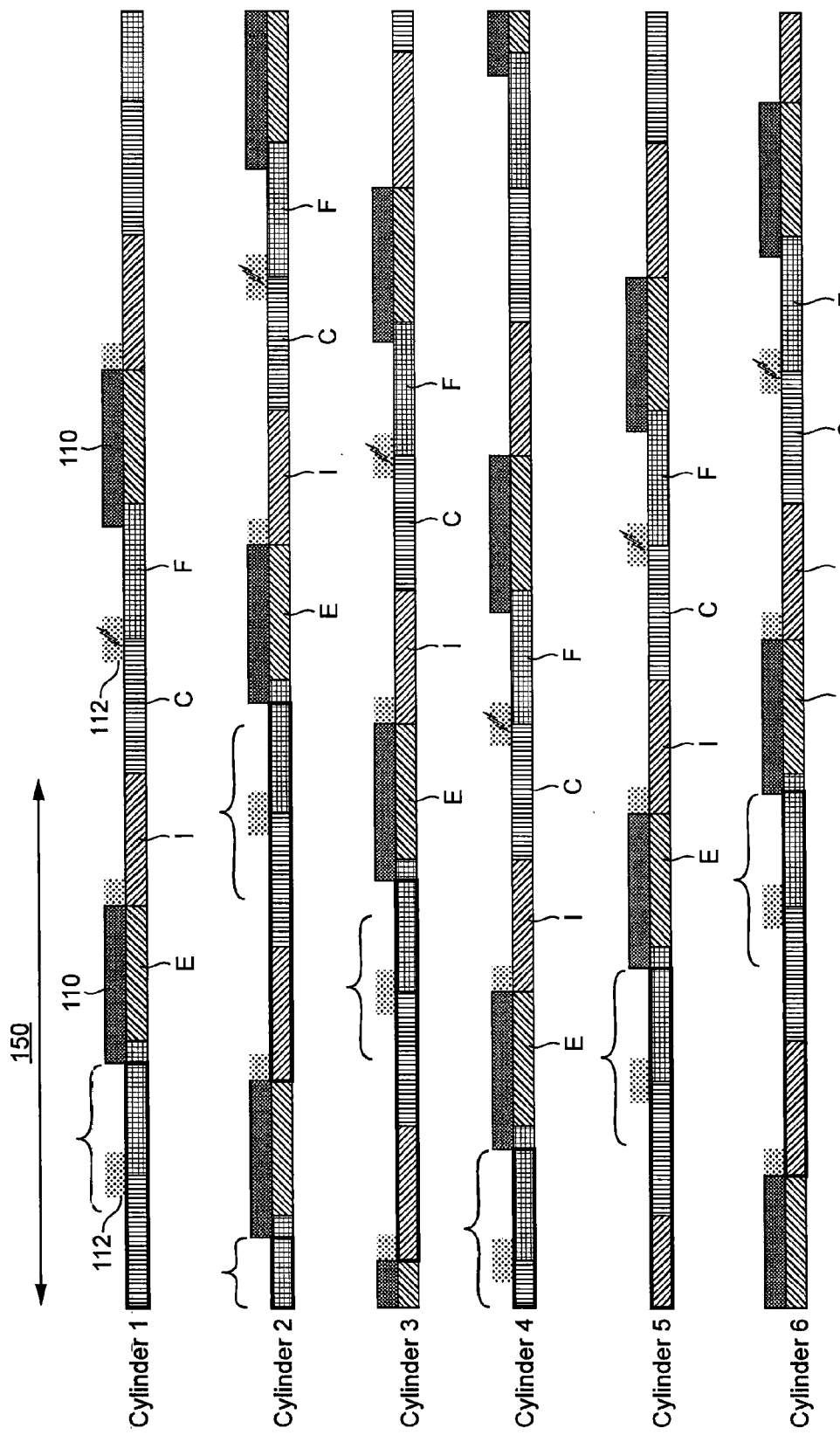

Timing diagrams illustrating when the first engine combustion cycles may take place after the valve pre-conditioning cycles are shown in FIGS. 8 and 9. FIG. 8 relates to a four cylinder in-line engine with firing order 1-3-4-2, whilst FIG. 9 is for a six cylinder in-line engine with firing order 1-5-3-6-2-4.

As illustrated in FIGS. 8 and 9, each cylinder cycles through the well-known stages of induction, compression, firing and exhaust, denoted by the sequence of blocks labelled I, C, F and E in the Figures.

The periods 110 marked above each sequence denote the time during which a mechanically driven exhaust valve is lifted away from its seat which therefore need to be avoided during pre-conditioning. Regions 112 indicate times at which the cylinder piston is at or close to top dead centre preventing cycling of the inlet valve.

The outlines 114, 116, 118 and 120 indicate the periods for each respective cylinder when it would be permissible to run the pre-conditioning cycle (without taking into account the potential areas of conflict with the exhaust valve and piston). Bracketed regions 122, 124, 126 and 128 indicate periods when in practice the pre-conditioning cycles might actually be run (subject to avoiding contact with the piston whilst it is in the proximity of its top dead centre position). These periods are staggered to reduce the peak current demand by the inlet valves during pre-conditioning.

It is advantageous to have more degrees of crank rotation available for the later-firing cylinders (which carry out pre-conditioning later) as the crank speed will have increased and so each pre-conditioning cycle will take more degrees of crank rotation to carry out. Thus region 124 is longer than region 122.

Lightning symbols 130, 132, 134 and 136 indicate the first viable opportunity to fire each respective cylinder after the pre-conditioning cycles have been completed. The time period 140 marked on FIG. 8 indicates the time taken for the first two revolutions of the engine crank. It can be seen that the first opportunity to fire takes place on cylinder 1 shortly after these first two revolutions.

The sequence of cylinder pre-conditioning cycles will vary depending on the position at which the crankshaft stopped after the previous operation of the engine. In the example illustrated, pre-cycling can begin immediately as the starting position of the crankshaft is such that the piston in cylinder 1 is away from its top dead centre position.

FIG. 9 is an illustration similar to that of FIG. 8, but showing the timing sequence for a six cylinder engine. Again, the periods of pre-cycling are selected to minimise the peak current demand. In this embodiment, no more than two of the periods when the pre-conditioned cycling might be run overlap at any one time. It can be seen that the pre-conditioning for cylinder 2 may be carried out during two discrete periods.

First firing occurs on cylinder 4. shortly after the first two crankshaft revolutions corresponding to period 150.

With engines having a number of cylinders greater than 6, it may become increasingly desirable to separate the pre-cycling periods for each cylinder into two or more discrete sub-periods. If appropriate, the time until the first firing may be delayed to allow for the desired cycling sequence to be carried out.

Whilst the first possible firing time is indicated in FIGS. 8 and 9, it may in some cases be appropriate to extend the pre-conditioning phase and delay the first firing. In this event, cranking of the engine may continue to allow further pre-conditioning cycles and delay first firing of the engine until it is appropriate for this to take place. Also, it may be desirable to delay the first firing of a cylinder until later than the first opportunity if the engine conditions are not suitable, for example if the cranking speed is not yet high enough.

If the valve pre-conditioning cycles are conducted during the initial cranking of the engine, the demand placed on the vehicle battery by pre-conditioning of the valves coincides with the power demand from the starter motor. An alternative approach, for example if the battery condition or the ambient conditions (such as extreme cold) are such that this is not practicable, it may be preferable to use an alternative method of cycling the valves which is carried out before cranking of the engine has commenced. In this approach, it would be necessary to ensure that when the engine was stopped, the crank position was set at a "safe" position with all pistons sufficiently far from the top dead centre area so that all the valves can be safely opened. With each valve/valve pair taking approximately 45 ms to cycle three times, a four cylinder engine with independently actuated valves on its inlets only would only need around 180 ms or less of delay between the user triggering operation of the engine ("key on") and engine cranking. This delay may be less than 180 ms, because the final part of the cycle of each actuator has a relatively low current demand, so sequential cycles could be overlapped.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A valve control system for an internal combustion engine, the engine having at least one cylinder with at least one valve and a piston, wherein the valve control system comprises a signal processing arrangement which is configured to:
   generate a control signal that controls a pre-conditioning actuation cycle of an actuator arranged to actuate the at least one valve;
   receive a feedback signal relating to an operating condition of the actuator during the pre-conditioning actuation cycle; and
   generate a modified control signal that controls a combustion actuation cycle of the actuator which is carried out during a combustion cycle of the at least one cylinder, wherein the modified control signal has been modified by the signal processing arrangement with reference to the feedback signal,
   wherein the pre-conditioning actuation cycle is carried out prior to a first combustion cycle of the at least one cylinder after a user has initiated an engine start, during cranking of the engine by a starter motor of the engine.

2. A system of claim 1, wherein the pre-conditioning actuation cycle is also carried out prior to cranking of the engine by a starter motor of the engine.

3. A system of claim 1, wherein the signal processing arrangement is configured to control the pre-conditioning actuation cycle of the actuator so as to avoid a collision between the valve and the piston within the at least one cylinder.

4. A system of claim 3, wherein the signal processing arrangement is configured to receive a piston position signal related to the position of the piston within the at least one cylinder, and to control the pre-conditioning actuation cycle of the actuator with reference to the piston position signal so as to avoid a collision between the valve and the piston.

5. A system of claim 1, wherein the signal processing arrangement is configured to generate control signals that control a pre-conditioning actuation cycle of both an inlet valve and an exhaust valve associated with the at least one cylinder prior to ignition of the engine while avoiding a collision between the two valves.

6. A system of claim 1, wherein a plurality of pre-conditioning actuation cycles are carried out, and the modified control signal is modified with reference to a plurality of feedback signals received in response to the plurality of pre-conditioning actuation cycles.

7. A system of claim 1, wherein the engine has a plurality of cylinders, each having at least one valve, and the signal processing arrangement is configured to generate a control signal that controls a pre-conditioning actuation cycle of at least one valve of each cylinder, and the pre-conditioning actuation cycles of the at least one valve of each cylinder are carried out sequentially, cylinder by cylinder.

8. A system of claim 1, wherein the engine has a plurality of cylinders, each having at least one valve, and the signal processing arrangement is configured to generate a control signal that controls a pre-conditioning actuation cycle of at least one valve of each cylinder, and the start times of the pre-conditioning actuation cycle(s) of the at least one valve of a first and a second cylinder are staggered such that a pre-conditioning actuation cycle of the actuator of at least one valve of the second cylinder overlaps in time with a pre-conditioning actuation cycle of the actuator of at least one valve of the first cylinder.

9. A system of claim 1 including an actuator to actuate the at least one valve, the operation of the actuator involving at least one of electromagnetically, hydraulically and pneumatically generated forces.

10. A system of claim 1, wherein the feedback signal is responsive to at least one of: the actuator displacement, the temperature of a winding in the actuator, the magnitude of a current in a winding of the actuator, the valve lift, the voltage across the actuator, at least one pressure within the actuator, and at least one pressure difference within the actuator.

11. An internal combustion engine including a valve control system of claim 1, and at least one cylinder with at least one associated valve.

12. A method of calibrating a valve control system of an internal combustion engine, the engine having at least one cylinder with at least one valve and a piston, and a valve control system of claim 1, the method comprising the steps of:
   generating a control signal with the signal processing arrangement that controls a pre-conditioning actuation cycle of the at least one valve;
   receiving a feedback signal at the signal processing arrangement relating to an operating condition of an actuator arranged to actuate the at least one valve during the pre-conditioning actuation cycle; and
   generating a modified control signal with the signal processing arrangement that controls a combustion actuation cycle of the actuator which is carried out during a combustion cycle of the at least one cylinder, wherein the modified control signal has been modified with reference to the feedback signal,
   wherein the pre-conditioning actuation cycle is carried out prior to the first combustion cycle of the at least one cylinder after a user has initiated an engine start, during cranking of the engine by a starter motor of the engine.

* * * * *